United States Patent
Shu et al.

(10) Patent No.: US 11,060,030 B2
(45) Date of Patent: Jul. 13, 2021

(54) NEGATIVE DIELECTRIC ANISOTROPY LIQUID CRYSTAL COMPOSITION

(71) Applicant: SHIJIAZHUANG CHENGZHI YONGHUA DISPLAY MATERIAL CO., LTD., Shijiazhuang (CN)

(72) Inventors: Ke-Lun Shu, Shijiazhuang (CN); Mingxia Wang, Shijiazhuang (CN); Huan Liu, Shijiazhuang (CN); Wenxiao Xing, Shijiazhuang (CN); Zhengqiang Li, Shijiazhuang (CN); Yiping Wang, Shijiazhuang (CN); Yongfeng Bao, Shijiazhuang (CN); Guoliang Yun, Shijiazhuang (CN)

(73) Assignee: SHIJIAZHUANG CHENGZHIYONGHUA DISPLAY MATERIAL CO., LTD., Shijiazhuang (CN)

( * ) Notice: Subject to any disclaimer, the term of this patent is extended or adjusted under 35 U.S.C. 154(b) by 91 days.

(21) Appl. No.: 16/221,327

(22) Filed: Dec. 14, 2018

(65) Prior Publication Data
US 2019/0185753 A1    Jun. 20, 2019

(30) Foreign Application Priority Data

Dec. 15, 2017  (CN) .......................... 201711349238.5

(51) Int. Cl.
| | |
|---|---|
| G02F 1/1333 | (2006.01) |
| C09K 19/44 | (2006.01) |
| C09K 19/32 | (2006.01) |
| C09K 19/20 | (2006.01) |
| C09K 19/12 | (2006.01) |
| C09K 19/30 | (2006.01) |
| C09K 19/34 | (2006.01) |
| C09K 19/04 | (2006.01) |

(52) U.S. Cl.
CPC .............. *C09K 19/44* (2013.01); *C09K 19/12* (2013.01); *C09K 19/20* (2013.01); *C09K 19/3003* (2013.01); *C09K 19/3028* (2013.01); *C09K 19/3066* (2013.01); *C09K 19/3098* (2013.01); *C09K 19/32* (2013.01); *C09K 19/3402* (2013.01); *C09K 2019/0466* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3021* (2013.01); *C09K 2019/3036* (2013.01); *C09K 2019/3408* (2013.01); *C09K 2019/3422* (2013.01); *C09K 2019/3425* (2013.01)

(58) Field of Classification Search
CPC ........ C09K 19/44; C09K 19/12; C09K 19/20; C09K 19/3003; C09K 19/3028; C09K 19/3066; C09K 19/3098; C09K 19/32; C09K 19/3402; C09K 2019/0466; C09K 2019/122; C09K 2019/123; C09K 2019/3004; C09K 2019/3009; C09K 2019/301; C09K 2019/3016; C09K 2019/3021; C09K 2019/3036; C09K 2019/3408; C09K 2019/3422; C09K 2019/3425; G02F 1/1333
USPC .................................................... 252/299.61
See application file for complete search history.

(56) References Cited

U.S. PATENT DOCUMENTS

| | | | | |
|---|---|---|---|---|
| 6,764,722 B2 * | 7/2004 | Klasen | ................... | C09K 19/44 428/1.1 |
| 7,026,022 B2 * | 4/2006 | Klasen-Memmer | ........................ | C09K 19/3003 252/299.63 |
| 10,472,570 B2 * | 11/2019 | Shu | ........................ | C09K 19/32 |
| 2019/0345390 A1 * | 11/2019 | Zai | ..................... | C09K 19/3491 |

* cited by examiner

*Primary Examiner* — Geraldina Visconti
(74) *Attorney, Agent, or Firm* — Muncy, Geissler, Olds & Lowe, P.C.

(57) ABSTRACT

A negative dielectric anisotropy liquid crystal composition having one or more A-R$_0$—B compounds represented by formula I above as a first component, and one or more compounds represented by formula II above as a second component:

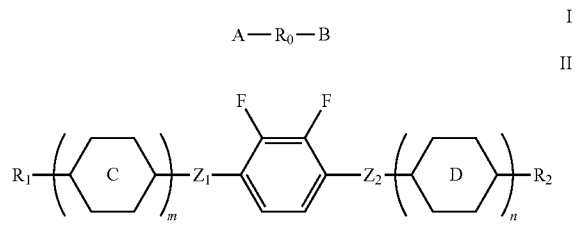

The liquid crystal composition has a good stability against light and heat, a lower viscosity, a wider refractive index that may be achieved by adjusting the monomer ratio, and a higher clearing point (a very wide service temperature range). The liquid crystal composition has a higher light transmittance, thus allowing a display device to have a higher brightness or an energy saving effect.

8 Claims, No Drawings

NEGATIVE DIELECTRIC ANISOTROPY LIQUID CRYSTAL COMPOSITION

TECHNICAL FIELD

The present invention belongs to the technical field of liquid crystal materials, and particularly relates to a negative dielectric anisotropy liquid crystal composition and a liquid crystal display device containing such a liquid crystal.

BACKGROUND ART

At present, the expansion of application range of liquid crystal compounds becomes larger and larger, and the liquid crystal compounds can be used in various types of negative dielectric anisotropy displays, electro-optical devices, sensors, etc. There are a wide range of liquid crystal compounds for use in the above-mentioned display field, wherein the application of nematic phase liquid crystals is the most extensive. Nematic phase liquid crystals have been used in passive TN and STN matrix displays and systems having a TFT active matrix.

With regard to the application field of thin film transistor techniques (TFT-LCD), although the market in recent years has become very huge, and the techniques also become gradually mature, requirements of display techniques are increasing continuously, especially in terms of achieving a quick response, reducing the drive voltage for reducing power consumption, etc. Liquid crystal materials as one of important optoelectronic materials for liquid crystal displays play an important role in improving the performance of liquid crystal displays.

As liquid crystal materials, they need to have good chemical and thermal stability and stability to electric fields and electromagnetic radiations. Moreover, as liquid crystal materials used for thin film transistor techniques (TFT-LCD), they not only need to have the stabilities as mentioned above, but also should have properties, such as a broader nematic phase temperature range, a suitable birefringence anisotropy, a very high electrical resistivity, a good ultraviolet resistant property, a high charge retention rate, a low vapour pressure, etc.

As for dynamic picture display applications, the liquid crystal is required to have a very fast response speed in order to eliminate ghosting and trailing of display pictures, and therefore the liquid crystal is required to have a lower rotary viscosity $\gamma_1$; in addition, for portable devices, in order to reduce the energy consumption of equipment, the drive voltage for the liquid crystal is desired to be as low as possible; and for displays for use in televisions, etc., the requirements for the drive voltage for the liquid crystal are not as low as that.

The viscosity, in particular rotary viscosity $\gamma_1$, of a liquid crystal compound directly affects the response time after the liquid crystal is energized, and both the rise time ($t_{on}$) and fall time ($t_{off}$) are proportional to the rotary viscosity $\gamma_1$ of the liquid crystal; moreover, since the rise time ($t_{on}$) is related to a liquid crystal cell and the drive voltage, it can be adjusted by means of increasing the drive voltage and reducing the thickness of the liquid crystal cell; while the fall time ($t_{off}$) is irrelevant to the drive voltage, but is mainly related to the elastic constant of the liquid crystal and the thickness of the liquid crystal cell, and thinning of cell thickness can result in a decrease in fall time ($t_{off}$); moreover, in different display modes, the movement manners of liquid crystal molecules are different, and the three modes TN, IPS and VA are inversely proportional to the mean elastic constant K, twist elastic constant and bend elastic constant, respectively.

According to the continuum theory of liquid crystal, a variety of different liquid crystals deformed under the action of an external force (an electric field, a magnetic field) can "rebound" back to the original shapes by intermolecular interactions; likewise, liquid crystals also form a "viscosity" due to the intermolecular force. Small changes of liquid crystal molecules may result in obvious changes in the conventional parameter performance of the liquid crystal, wherein for some of these changes, there is a certain rule, while for some changes, it is difficult to find a rule, which may also have obvious effects on the intermolecular interaction of the liquid crystal, these effects are very subtle, and to date, no perfect theoretical explanation has been formed yet.

The viscosity of a liquid crystal is related to the molecular structure of the liquid crystal, and studying the relationship between the viscosity of a liquid crystal system formed from different liquid crystal molecules and the molecular structures of the liquid crystals is one of important tasks of liquid crystal formulation engineers.

The reason why a liquid crystal display panel has a high energy consumption is that only about 5% of backlight can transmit through a display device and then be captured by human eyes, while most of the light is "wasted". If a liquid crystal having a high light transmittance can be developed, then the backlight intensity can be reduced, thereby achieving the purpose of saving energy consumption and extending the service time of a device.

SUMMARY OF THE INVENTION

The technical problem to be solved by the present invention is to provide a liquid crystal composition that has a good stability against light and heat and a lower viscosity, and can achieve a wider refractive index and a higher clearing point (a very wide service temperature range) by the adjustment the ratio of the monomers, and in particular, the liquid crystal composition has a higher light transmittance, thus allowing a display device to have a higher brightness or an energy saving effect.

In order to solve the above-mentioned technical problems, the present invention provides a negative dielectric anisotropy liquid crystal composition, characterized in that said liquid crystal composition comprises one or more A-R$_0$—B compounds represented by formula I as a first component, and one or more compounds represented by formula II as a second component:

$$A—R_0—B \qquad I$$

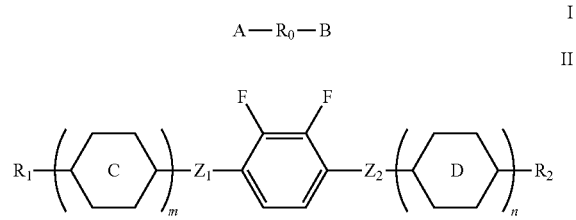

II wherein

A represents a group having a physical property of having a dielectric anisotropy constant of greater than or equal to 0;

B represents a group having a physical property of having a dielectric anisotropy constant of less than or equal to 0;

$R_0$ represents one or more of $CF_2O$, $OCF_2$, $OCF_2O$, CHFO, OCHF, OCHFO, $CF_2$, CHF, $CH_2$, $CH_2CH_2$, $CHFCH_2$, $CH_2CHF$, CHFCHF, $CF_2CH_2$, $CH_2CF_2$, $CF_2CHF$, $CHFCF_2$, $CF_2CF_2$, CHCH, CFCH, CHCF, CFCF, Si, N, O, S, $CR^*_2CR^{**}_2$, $CR^*FCR^{**}_2$, $CR^*_2CR^{**}F$, $CR^*FCR^{}F$, $CF_2CR^{}_2$, $CR^*_2CF_2$, $CF_2CR^{**}F$, $CR^*FCF_2$, $CR^*CR^{}$, $CFCR^{}$, $CR^*CF$,

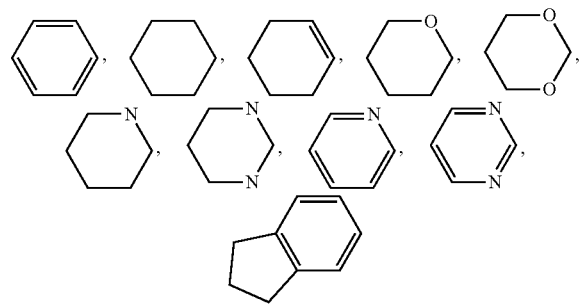

and/or any fluorobenzene;

$R^*$ and $R^{**}$ each independently represent H, an alkyl group having a carbon atom number of 1-10, an alkoxy group having a carbon atom number of 1-10, an alkenyl group having a carbon atom number of 2-10, or an alkenoxy group having a carbon atom number of 3-8;

$R_1$ and $R_2$ each independently represent an alkyl group having a carbon atom number of 1-10, fluorine, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more $CH_2$ in the groups represented by $R_1$ and $R_2$ may be substituted with cyclopentyl, cyclobutyl or cyclopropyl;

$Z_1$ and $Z_2$ each independently represent a single bond, $-CH_2CH_2-$ or $-CH_2O-$;

each independently represent one or more of

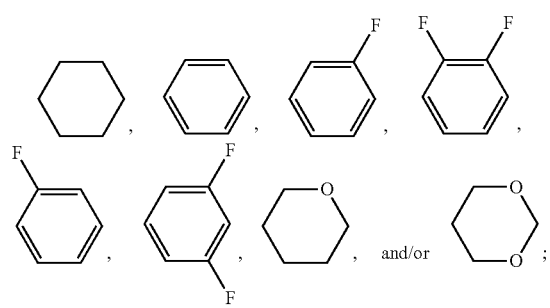

m represents 1, 2 or 3; and
n represents 0 or 1.

After mixing the compounds of formula I and formula 2, the liquid crystal molecules are less prone to bending elastic deformation due to the interaction of the properties of the molecules themselves, the intermolecular forces and the electric field forces, thereby maintaining a neat alignment in the direction perpendicular to the direction of the electric field and reducing the loss of light that is transmitted through the liquid crystal molecules, thus increasing the transmittance.

The one or more $A-R_0-B$ compounds represented by formula I are preferably one or more of compounds represented by formulas I1 to I3; and the one or more compounds represented by formula II are preferably one or more of compounds represented by formulas II1 to II13:

I1
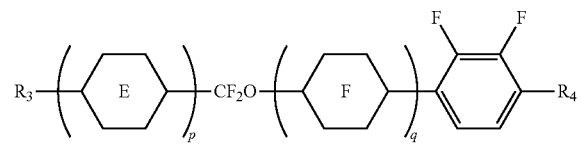

I2
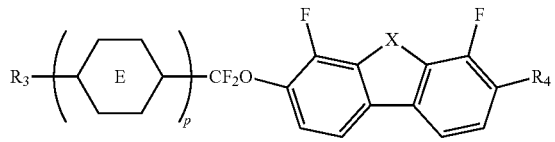

I3
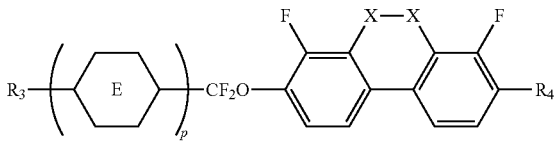

II1
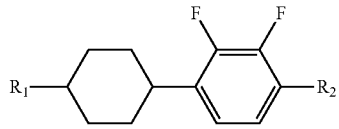

II2
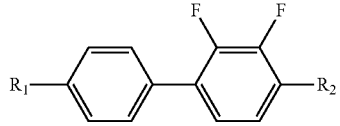

II3
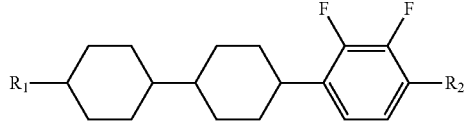

II4
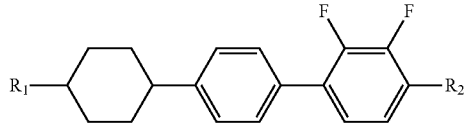

II5

-continued

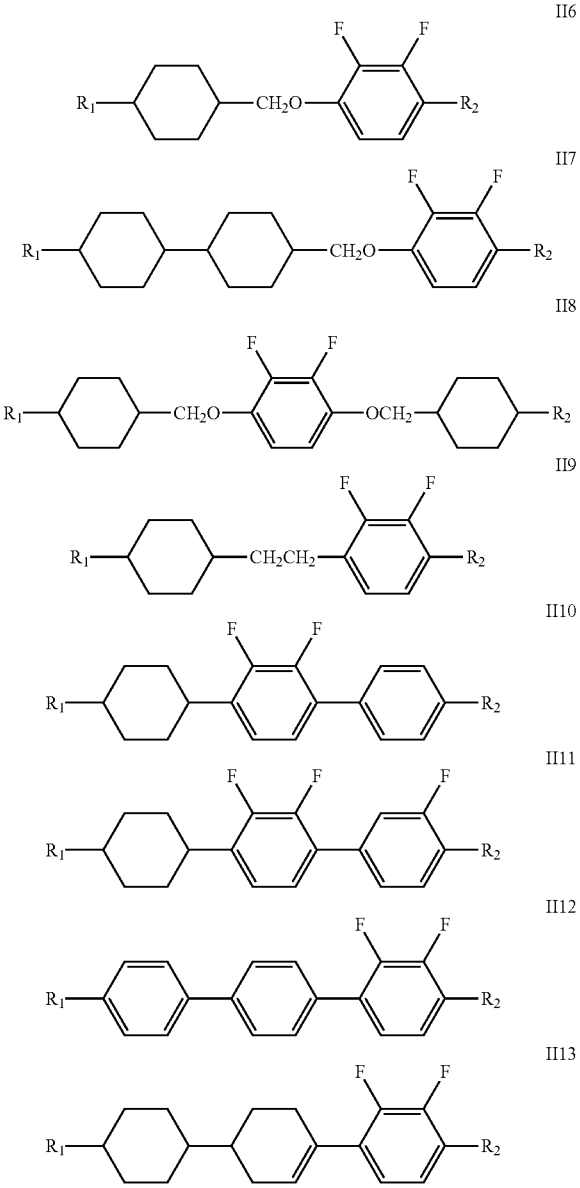

wherein

R$_3$ and R$_4$ each independently represent an alkyl group having a carbon atom number of 1-10, fluorine, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more CH$_2$ in the groups represented by R$_3$ and R$_4$ may be substituted with cyclopentyl, cyclobutyl or cyclopropyl;

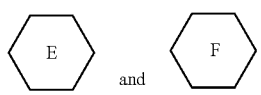

each independently represent

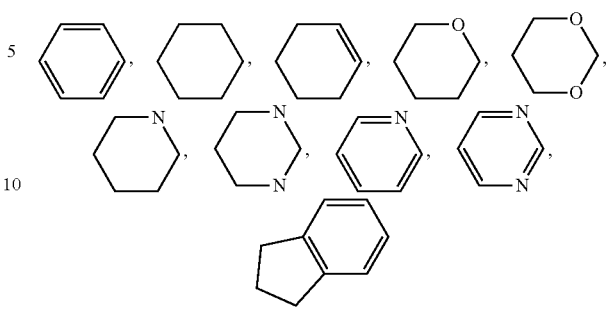

or any fluorobenzene;

R$_1$ and R$_2$ each independently represent an alkyl group having a carbon atom number of 1-10, fluorine, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more CH$_2$ in the groups represented by R$_1$ and R$_2$ may be substituted with cyclopentyl, cyclobutyl or cyclopropyl;

each X independently represents CH$_2$, O or S;

p represents 1, 2 or 3;

and q represents 0, 1 or 2.

Said one or more compounds represented by formula I1 are further preferably one or more of compounds represented by formulas I1-1 to I1-14; said one or more compounds represented by formula I2 are further preferably one or more of compounds represented by formulas I2-1 to I2-8; and said one or more compounds represented by formula I3 are further preferably one or more of compounds represented by formulas I3-1 to I3-8:

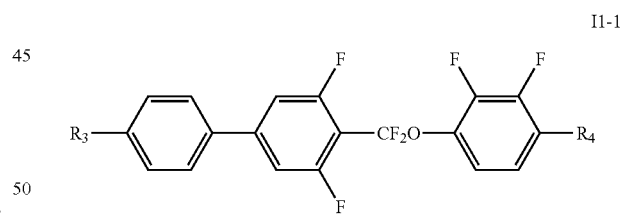

I1-1

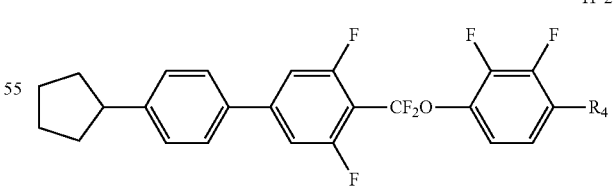

I1-2

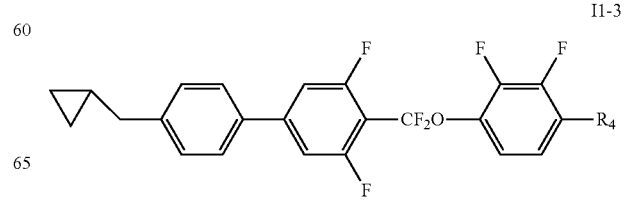

I1-3

I1-4
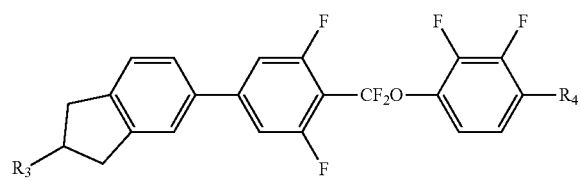
I1-5
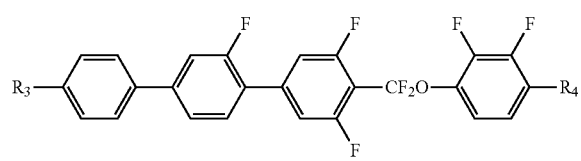
I1-6
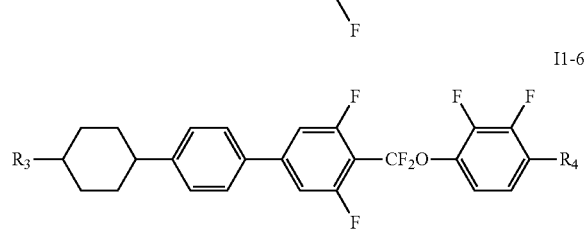
I1-7
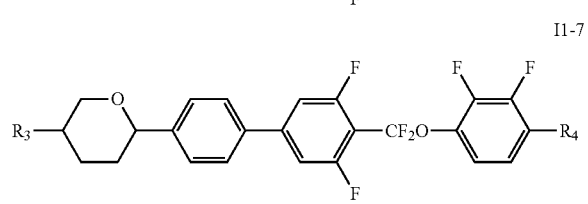
I1-8
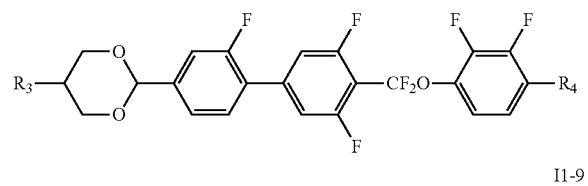
I1-9
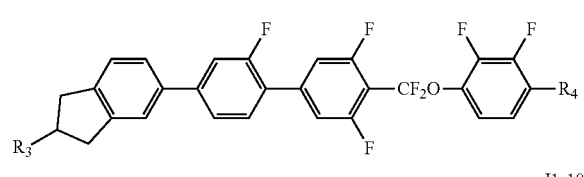
I1-10
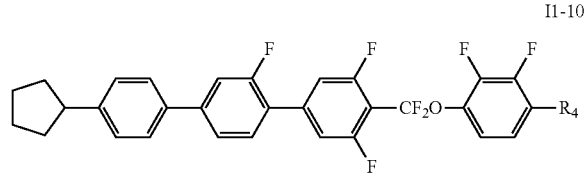
I1-11
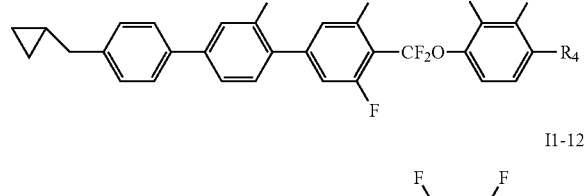
I1-12
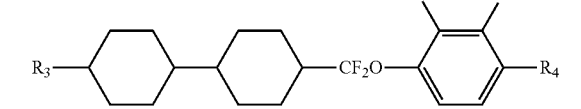
I1-13
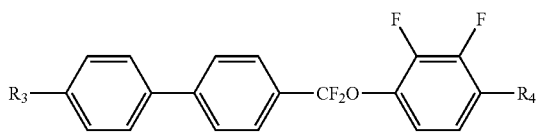
I1-14
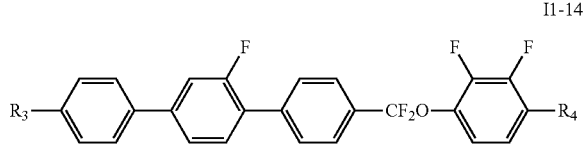
I2-1
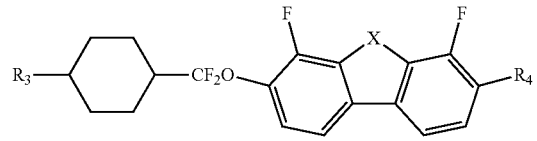
I2-2
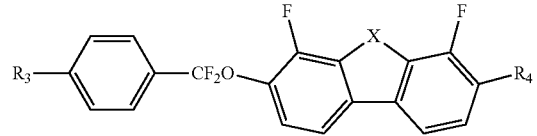
I2-3
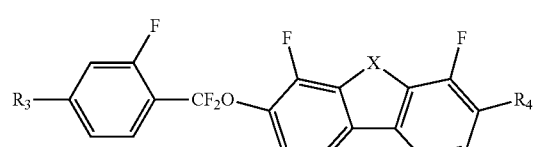
I2-4
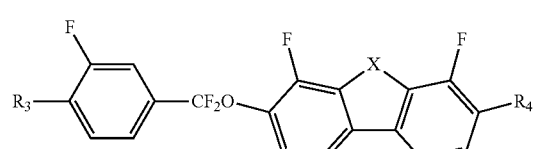
I2-5
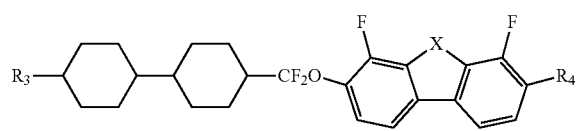
I2-6
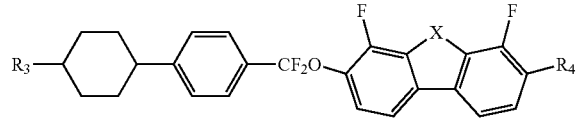
I2-7
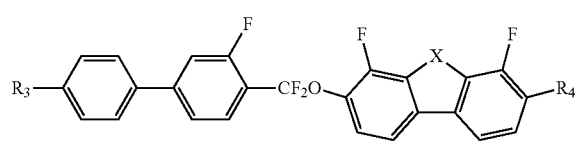

-continued

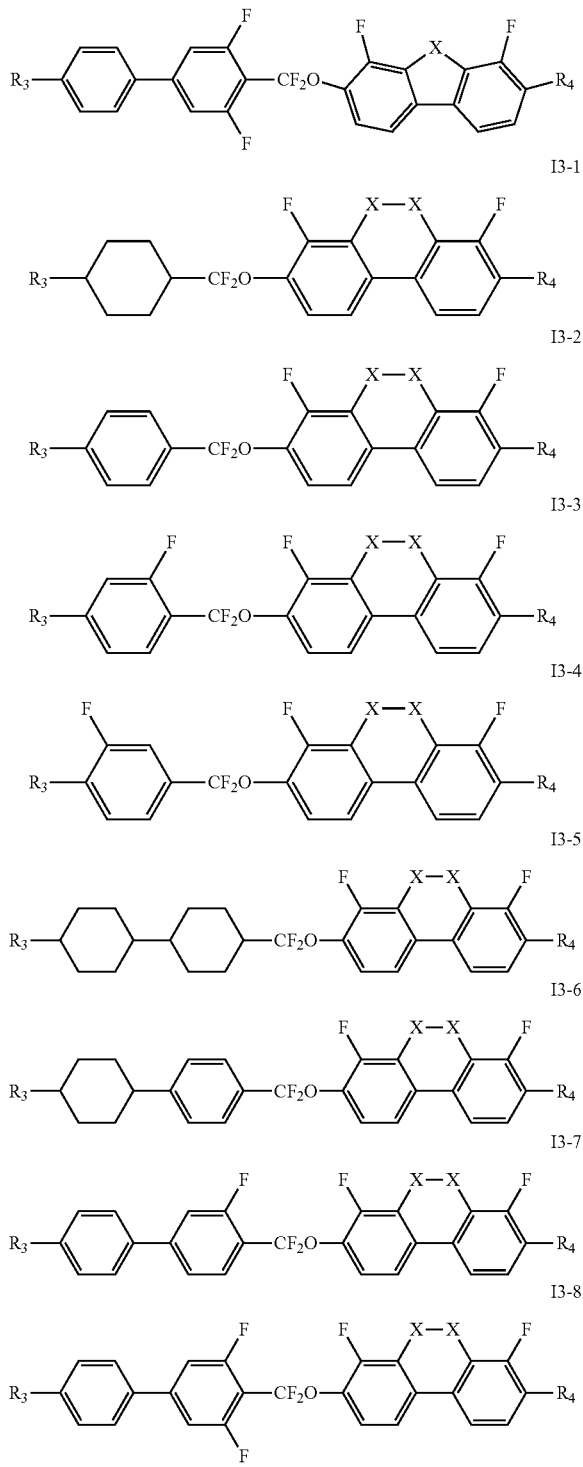

wherein R₃ and R₄ each independently represent an alkyl group having a carbon atom number of 1-10, fluorine, a fluorine-substituted alkyl group having a carbon atom number of 1-10, fluorine, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more $CH_2$ in groups $R_3$ and $R_4$ may be substituted with cyclopentyl, cyclobutyl or cyclopropyl;

and each X independently represents $CH_2$, O or S.

In the liquid crystal composition of the present invention, the total content in mass percentage of said one or more compounds represented by formula I is preferably 1-40%, and the total content in mass percentage of said one or more compounds represented by formula II is preferably 1-65%.

The liquid crystal composition provided by the present invention may further comprise one or more compounds represented by formula III:

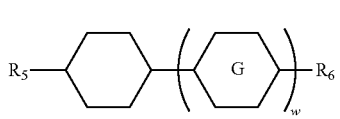

wherein $R_5$ and $R_6$ each independently represent an alkyl group having a carbon atom number of 1-10, an alkoxy group having a carbon atom number of 1-10, an alkenyl group having a carbon atom number of 2-10 or an alkenoxy group having a carbon atom number of 3-8, and any one or more unconnected $CH_2$ in the groups represented by $R_5$ and $R_6$ may be substituted with cyclopentyl, cyclobutyl, cyclopropyl, or —O—;

represents one or more of

or any fluorobenzene;

and each w independently represents 1, 2 or 3.

Said one or more compounds represented by formula III are preferably compounds of formulas III1 to III5

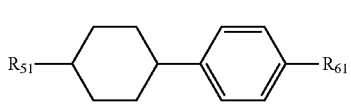

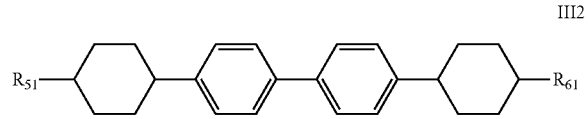

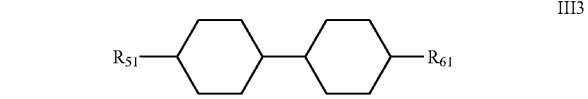

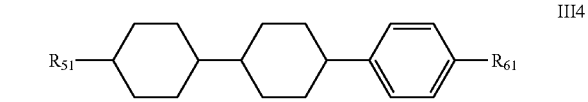

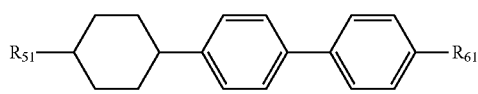

wherein $R_{51}$ and $R_{61}$ each independently represent an alkyl group having a carbon atom number of 1-6, an alkoxy group having a carbon atom number of 1-6, an alkenyl group having a carbon atom number of 2-6 or an alkenoxy group having a carbon atom number of 3-6.

The added mass amount of the compounds represented by the formula III is preferably between 1% and 60%, further preferably 5-40%.

Said liquid crystal composition may further comprise one or more compounds represented by formula IV

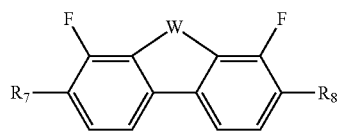

wherein $R_7$ and $R_8$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more $CH_2$ in groups $R_7$ and $R_8$ may be substituted with cyclopentyl, cyclobutyl or cyclopropyl;

and W represents —O—, —S— or —$CH_2O$—.

Said liquid crystal composition may further comprise one or more compounds represented by formula V:

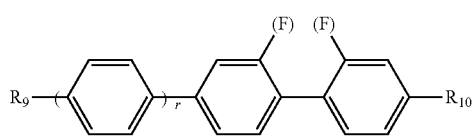

wherein $R_9$ represents an alkyl group having a carbon atom number of 1-5 or an alkenyl group having a carbon atom number of 2-5;

$R_{10}$ represents an F atom, an alkyl group having a carbon atom number of 1-5, an alkoxy group having a carbon atom number of 1-5 or an alkenyl group having a carbon atom number of 2-5, and any one or more $CH_2$ in the groups represented by $R_9$ and $R_{10}$ may be substituted with cyclopentyl, cyclobutyl or cyclopropyl;

r represents 0 or 1;

and each (F) independently represents H or F.

In the case of the same amount of delay, Vop (operating voltage) and temperature, the high transmittance FFS and IPS display modes are dominated by the physical properties of the following liquid crystal materials:

a. a positive liquid crystal material doped with an A-$R_0$—B material.

b. a negative liquid crystal material doped with an A-$R_0$—B material.

c. only the A-$R_0$—B material itself.

The physical properties of the liquid crystal material containing the monomer A-$R_0$—B are limited by the following ranges; in the case of the temperature being equal to 20° C., the range of Δn is from 0.0700 to 0.2500, the vertical dielectricity ($\varepsilon_\perp$) is >5, the parallel dielectricity ($\varepsilon_\parallel$) is >5, the range of Δε=parallel dielectricity ($\varepsilon_\parallel$)—vertical dielectricity ($\varepsilon_\perp$) is −6 to +14, the elastic constant k11 is >9 (PN), K33>10 (PN), and K11/K33<1. In addition, the temperature is from −30° C. to 90° C., with the ratio of K11/K33 being <1.

The present invention relates to a liquid crystal display element or liquid crystal display comprising the above-mentioned liquid crystal composition, characterized in that said liquid crystal display element or liquid crystal display is an active matrix display element or display or a passive matrix display element or display.

The display element or display may be of a TN, ECB, VA, IPS, FFS, PS-TN, PS-VA, PS-IPS, PS-FFS, PA-VA, PA-IPS, PA-FFS, PI-less VA, PI-less IPS, or PI-less-FFS LCD mode.

DETAILED DESCRIPTION OF EMBODIMENTS

The present invention is further described in conjunction with particular examples below, but the present invention is not limited to the following examples. Said methods are all conventional methods, unless otherwise specified. Said raw materials are all commercially available, unless otherwise specified.

The reaction process is generally monitored through TLC, and the post-treatments after the reaction is completed are generally water washing, extracting, combining organic phases and then drying, evaporating and removing the solvent under a reduced pressure, recrystallization and column chromatographic separation; and a person skilled in the art would be able to achieve the present invention according to the following description.

In the present specification, the percentages are mass percentages, the temperatures are in degree Celsius (° C.), and the specific meanings of other symbols and the test conditions are as follows:

Cp represents the clearing point of the liquid crystal (° C.), as measured by means of a DSC quantitative method;

Δn represents optical anisotropy, $n_o$ is the refractive index of an ordinary light, $n_e$ is the refractive index of an extraordinary light, with the test conditions being: 25±2° C., 589 nm and using an abbe refractometer for testing;

Δε represents the dielectric anisotropy, $\Delta\varepsilon=\varepsilon_\parallel-\varepsilon_\perp$, wherein the $\varepsilon_\parallel$ is a dielectric constant parallel to a molecular axis, and $\varepsilon_\perp$ is a dielectric constant perpendicular to the molecular axis, with the test conditions being: 25±0.5° C., using 20-micron parallel cells, and using INSTEC: ALCT-IR1 for testing;

γ1 represents a rotary viscosity (mPa·s), with the test conditions being: 25±0.5° C., using 20-micron parallel cells, and using INS TEC: ALCT-IR1 for testing; and Tr (%) represents a transmittance, Tr (%)=100%*bright state (Vop) luminance/light source luminance, the test device is DMS501, the test condition is 25±0.5° C., the test cell is a 3.9 micron IPS test cell, both the electrode spacing and the electrode width are 3*5 microns, and the included angle between the frictional direction and the electrode is 83°; therefore, there is a positive correlation between $\varepsilon_\perp$ and Tr, so in the evaluation of the transmittance, a⊥ can be used as an evaluation index for indication.

In the examples of the invention of the present application, liquid crystal monomer structures are represented by codes, and the codes for ring structures, end groups and linking groups of liquid crystals are represented as in Tables (I) and (II) below

TABLE (I)

| Corresponding code for ring structure | |
|---|---|
| Ring structure | Corresponding code |
| (cyclohexane) | C |
| (benzene) | P |
| (F-benzene) | G |
| (2,3-diF-benzene) | U |
| (3,4,5-triF-benzene) | GI |
| (2,3-diF-benzene alt) | Y |
| (piperidine) | PI |
| (piperazine) | HHPY |
| (pyridine) | N |
| (pyrimidine) | M |
| (tetrahydropyran) | A |
| (dioxane) | D |
| (chromene-type, F-substituted) | BHHO-m-nFF |
| (dibenzofuran, F-substituted) | DFDBF-m-m |
| (dibenzothiophene, F-substituted) | B(S) |

TABLE (II)

| Corresponding code for end group and linking group | |
|---|---|
| End group and linking group | Corresponding code |
| $C_nH_{2n+1}$— | n- |
| $C_nH_{2n+1}O$— | nO— |
| —$OCF_3$ | OT |
| —$CF_3$ | —T |
| —$CF_2O$— | Q |
| —F | —F |
| —CN | —N |
| —CH2CH2— | E |
| —CH=CH— | V |
| —C≡C— | T |
| —COO— | Z |
| —CH=CH—CnH2n+1 | —Vn |
| (cyclopentyl) | C(5) |
| (cyclobutyl) | C(4) |
| (cyclopropylmethyl) | C(3)1 |

EXAMPLES

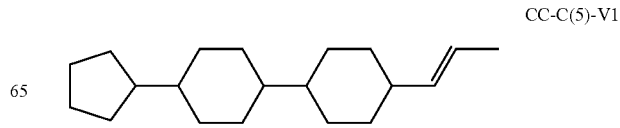

CC-C(5)-V1

PGUQU-3-F

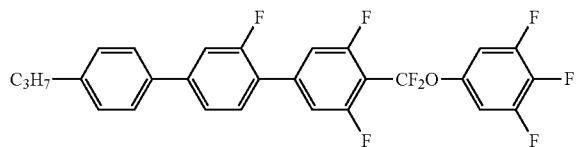

Comparative Example 1

| Category | Liquid crystal monomer code | Content (%) |
|---|---|---|
| III | CPP-3-2V1 | 5.50 |
| III | CC-3-V | 35.00 |
| III | CC-3-V1 | 9.50 |
| II | CCOY-2-O2 | 9.00 |
| II | CCOY-3-O2 | 8.00 |
| II | CCOY-4-O2 | 9.00 |
| IV | DFDBF-Cp10-O4 | 4.00 |
| IV | DFDBF-Cp10-O5 | 4.00 |
| II | PYP-2-1Cpr | 8.00 |
| IV | BHHO-Cp1O-O4FF | 8.00 |

$\Delta\varepsilon$ [1 KHz, 25° C.]: −3.87
$\varepsilon_\perp$: 7.55
$\Delta n$ [589 nm, 25° C.]: 0.1032
Cp: 84.9° C.
$\gamma_1$ [25° C.]: 100 m Pa · s.

Comparative Example 2

| Category | Liquid crystal monomer code | Content (%) |
|---|---|---|
| III | CPP-3-2 | 3.00 |
| III | CPP-3-2-V1 | 9.00 |
| III | CC-3-V | 42.00 |
| III | CC-3-V1 | 9.00 |
| II | CCOY-2-O2 | 5.00 |
| II | CCOY-3-O2 | 6.00 |
| II | CCOY-3-O2 | 5.00 |
| IV | DFDBF-Cp10-O4 | 4.00 |
| IV | DFDBF-Cp10-O5 | 4.00 |
| II | PP-5-O2 | 6.50 |
| II | PYP-2-1Cpr | 6.50 |

$\Delta\varepsilon$ [1 KHz, 25° C.]: −1.78
$\varepsilon_\perp$: 5.00
$\Delta n$ [589 nm, 25° C.]: 0.1027
Cp: 80.9° C.
$\gamma_1$ [25° C.]: 58 m Pa · s.

After filling test cells with the liquid crystal compositions for testing, the following results are obtained: At a working voltage equal to 6 V, the transmittance of Example 1 is higher than that of Comparative Example 1 by about 3.0%, and at a working voltage equal to 10 V, the transmittance of Example 2 is higher than that of Comparative Example 2 by about 4.0%.

Example 1

| Category | Liquid crystal monomer code | Content (%) |
|---|---|---|
| III | CC-3-V | 28.00 |
| III | CC-3-V1 | 10.00 |
| III | CC-3-5 | 4.00 |
| II | CCOY-2-O2 | 10.00 |
| II | CCOY-3-O2 | 10.00 |
| II | CCOY-4-O2 | 10.00 |
| IV | DFDBF-Cp10-O4 | 2.00 |
| IV | DFDBF-Cp10-O5 | 2.50 |
| I | PUQY-3-O2 | 5.00 |
| I | PUQY-3-O4 | 4.50 |
| II | PYP-2-1Cpr | 6.00 |
| IV | BHHO-Cp1O-O4FF | 8.00 |

$\Delta\varepsilon$ [1 KHz, 25° C.]: −3.83
$\varepsilon_\perp$: 7.86
$\Delta n$ [589 nm, 25° C.]: 0.1006
Cp: 84.6° C.
$\gamma_1$ [25° C.]: 128 m Pa · s.

Example 2

| Category | Liquid crystal monomer code | Content (%) |
|---|---|---|
| III | CC-3-V | 42.00 |
| III | CC-3-V1 | 9.00 |
| III | CPP-3-2V1 | 9.00 |
| II | CCOY-2-O2 | 5.00 |
| II | CCOY-3-O2 | 6.00 |
| II | CCOY-4-O2 | 5.00 |
| IV | DFDBF-Cp10-O4 | 4.00 |
| IV | DFDBF-Cp10-O5 | 4.00 |
| I | PUQY-3-O2 | 6.50 |
| I | PUQY-3-O4 | 6.50 |
| I | PGUQY-3-O2 | 3.00 |

$\Delta\varepsilon$ [1 KHz, 25° C.]: −1.89
$\varepsilon_\perp$: 5.78
$\Delta n$ [589 nm, 25° C.]: 0.0995
Cp: 81.9° C.
$\gamma_1$ [25° C.]: 78 m Pa · s.

Example 3

| Category | Liquid crystal monomer code | Content (%) |
|---|---|---|
| III | CC-3-V | 30.00 |
| III | CC-3-V1 | 10.00 |
| III | CC-3-5 | 4.00 |
| II | CCOY-2-O2 | 10.00 |
| II | CCOY-3-O2 | 10.00 |
| II | CCOY-4-O2 | 10.00 |
| I | PUQY-3-O2 | 9.00 |
| I | PUQY-3-O4 | 11.00 |
| II | PYP-2-1Cpr | 6.00 |

$\Delta\varepsilon$ [1 KHz, 25° C.]: −2.53
$\varepsilon_\perp$: 6.57
$\Delta n$ [589 nm, 25° C.]: 0.0980
Cp: 86.0° C.
$\gamma_1$ [25° C.]: 115 m Pa · s.

Example 4

| Category | Liquid crystal monomer code | Content (%) |
|---|---|---|
| III | CC-3-V | 39.00 |
| III | CC-3-V1 | 6.00 |
| III | CPP-3-2V1 | 7.00 |
| II | CCOY-2-O2 | 9.00 |
| II | CCOY-3-O2 | 8.00 |
| II | CCOY-4-O2 | 9.00 |

17

-continued

| Category | Liquid crystal monomer code | Content (%) |
|---|---|---|
| IV | DFDBF-Cp1O-O4 | 6.00 |
| IV | DFDBF-Cp1O-O5 | 6.00 |
| I | PUQY-3-F | 7.00 |
| I | PGUQY-3-F | 3.00 |

Δε [1 KHz, 25° C.]: −2.22
$\varepsilon_\perp$: 7.26
Δn [589 nm, 25° C.]: 0.0985
Cp: 83.0° C.
$\gamma_1$ [25° C.]: 67 m Pa · s.

Example 5

| Category | Liquid crystal monomer code | Content (%) |
|---|---|---|
| III | CPP-5-2 | 8.00 |
| III | CC-3-V | 19.00 |
| III | CC-3-V1 | 5.00 |
| III | CPP-3-2V1 | 8.00 |
| II | CY-3-O2 | 14.00 |
| II | CY-3-O4 | 7.00 |
| II | CY-5-O2 | 12.00 |
| II | CCY-2-O2 | 10.00 |
| II | CCY-3-O2 | 8.00 |
| II | PYP-2-3 | 6.00 |
| I | PUQY-3-O2 | 3.00 |

Δε [1 KHz, 25° C.]: −3.18
$\varepsilon_\perp$: 6.96
Δn [589 nm, 25° C.]: 0.1006
Cp: 75.3° C.
$\gamma_1$ [25° C.]: 18 m Pa · s.

Example 6

| Category | Liquid crystal monomer code | Content (%) |
|---|---|---|
| III | CCH-23 | 22.00 |
| III | CCH-34 | 5.00 |
| III | CCH-35 | 5.00 |
| II | CY-3-O2 | 11.00 |
| II | CCY-3-O2 | 6.00 |
| II | CLY-3-O2 | 10.00 |
| II | CPY-2-O2 | 10.00 |
| II | CPY-3-O2 | 10.00 |
| II | PY-3-O2 | 15.00 |
| II | PYP-2-3 | 3.00 |
| I | PUQY-3-O2 | 3.00 |

Δε [1 KHz, 25° C.]: −3.89
$\varepsilon_\perp$: 7.84
Δn [589 nm, 25° C.]: 0.1098
Cp: 72.9° C.
$\gamma_1$ [25° C.]: 93 m Pa · s.

Example 7

| Category | Liquid crystal monomer code | Content (%) |
|---|---|---|
| III | CCH-23 | 22.00 |
| III | CCH-34 | 5.00 |
| III | CCH-35 | 5.00 |
| II | CY-3-O2 | 11.00 |
| II | CCY-3-O2 | 6.00 |
| II | CLY-3-O2 | 10.00 |
| II | CPY-2-O2 | 10.00 |
| II | CPY-3-O2 | 10.00 |

18

-continued

| Category | Liquid crystal monomer code | Content (%) |
|---|---|---|
| II | PY-3-O2 | 5.00 |
| II | PY-2O-O2 | 5.00 |
| II | PY-2O-O4 | 5.00 |
| II | PPY-5-O2 | 3.00 |
| I | PUQY-3-O2 | 3.00 |

Δε [1 KHz, 25° C.]: −4.09
$\varepsilon_\perp$: 8.04
Δn [589 nm, 25° C.]: 0.1149
Cp: 80.9° C.
$\gamma_1$ [25° C.]: 109 m Pa · s.

Example 8

| Category | Liquid crystal monomer code | Content (%) |
|---|---|---|
| III | CCH-23 | 18.75 |
| III | CC-3-V1 | 8.00 |
| II | COY-3-O2 | 4.00 |
| III | CP-3-O1 | 10.50 |
| III | CCP-3-O1 | 5.00 |
| II | CCOY-2-O2 | 10.75 |
| II | CCOY-3-O2 | 8.25 |
| II | CCOY-4-O2 | 11.25 |
| III | CPP-1V-2 | 4.25 |
| II | PY-3-O2 | 8.25 |
| I | PUQY-3-O2 | 5.00 |
| I | PUQY-3-O4 | 6.00 |

Δε [1 KHz, 25° C.]: −3.69
$\varepsilon_\perp$: 7.75
Δn [589 nm, 25° C.]: 0.0996
Cp: 81.0° C.
$\gamma_1$ [25° C.]: 161 m Pa · s.

Example 9

| Category | Liquid crystal monomer code | Content (%) |
|---|---|---|
| III | CC-3-V | 23.00 |
| III | CC-3-V1 | 9.00 |
| III | CC-V-V1 | 20.00 |
| II | CCOY-2-O2 | 3.00 |
| II | CCOY-3-O2 | 8.00 |
| II | CCOY-4-O2 | 5.00 |
| III | CPP-1V-2 | 8.00 |
| IV | DFDBF-Cp1O-O4 | 4.00 |
| IV | DFDBF-Cp1O-O5 | 4.00 |
| I | PGUQY-3-O2 | 3.00 |
| I | PUQY-3-O2 | 6.50 |
| I | PUQY-3-O4 | 6.50 |

Δε [1KHz, 25° C.]: −1.88
$\varepsilon_\perp$: 5.77
Δn [589 nm, 25° C.]: 0.1020
Cp: 83.5° C.
$\gamma_1$ [25° C.]: 80 m Pa · s.

Example 10

| Category | Liquid crystal monomer code | Content (%) |
|---|---|---|
| IV | BHHO-Cp1O-O4FF | 4.00 |
| III | CC-3-V | 29.00 |
| III | CCP-3-O1 | 2.00 |
| II | CCOY-2-O2 | 15.00 |
| II | CCOY-3-O2 | 15.00 |

-continued

| Category | Liquid crystal monomer code | Content (%) |
|---|---|---|
| II | CCOY-4-O2 | 15.00 |
| II | PY-3-O2 | 12.00 |
| I | PUQY-3-O2 | 4.00 |
| I | PUQY-3-O4 | 4.00 |

$\Delta\varepsilon$[1 KHz, 25° C.]: −5.60
$\varepsilon_\perp$: 10.10
$\Delta n$ [589 nm, 25° C.]: 0.0990
Cp: 87.8° C.
$\gamma_1$[25° C.]: 156 m Pa · s.

Example 11

| Category | Liquid crystal monomer code | Content (%) |
|---|---|---|
| IV | BHHO-Cp1O-O4FF | 4.00 |
| III | CC-3-V | 29.00 |
| III | CCP-3-O1 | 2.00 |
| II | CCOY-2-O2 | 15.00 |
| II | CCOY-3-O2 | 15.00 |
| II | CCOY-4-O2 | 15.00 |
| II | PY-3-O2 | 12.00 |
| I | PUQY-Cp-O2 | 4.00 |
| I | PUQY-Cpr1-O2 | 4.00 |

$\Delta\varepsilon$[1 KHz, 25° C.]: −5.60
$\varepsilon_\perp$: 10.10
$\Delta n$ [589 nm, 25° C.]: 0.1000
Cp: 90.0° C.
$\gamma_1$[25° C.]: 60 m Pa · s.

Example 12

| Category | Liquid crystal monomer code | Content (%) |
|---|---|---|
| IV | BHHO-Cp1O-O4FF | 4.00 |
| III | CC-3-V | 29.00 |
| III | CCP-3-O1 | 2.00 |
| II | CCOY-2-O2 | 15.00 |
| II | CCOY-3-O2 | 15.00 |
| II | CCOY-4-O2 | 15.00 |
| II | PY-3-O2 | 12.00 |
| I | PUQDFDBF-3-O2 | 4.00 |
| I | PQDFDBF-3-O2 | 4.00 |

$\Delta\varepsilon$[1 KHz, 25° C.]: −5.80
$\varepsilon_\perp$: 10.30
$\Delta n$ [589 nm, 25° C.]: 0.0960
Cp: 85.0° C.
$\gamma_1$[25° C.]: 150 m Pa · s.

Example 13

| Category | Liquid crystal monomer code | Content (%) |
|---|---|---|
| IV | BHHO-Cp1O-O4FF | 4.00 |
| III | CC-3-V | 29.00 |
| III | CCP-3-O1 | 2.00 |
| II | CCOY-2-O2 | 15.00 |
| II | CCOY-3-O2 | 15.00 |
| II | CCOY-4-O2 | 15.00 |
| II | PY-3-O2 | 12.00 |

-continued

| Category | Liquid crystal monomer code | Content (%) |
|---|---|---|
| I | PUQBHHO-3-O2 | 4.00 |
| I | GQDFDBF-3-O2 | 4.00 |

$\Delta\varepsilon$[1 KHz, 25° C.]: −6.00
$\varepsilon_\perp$: 10.70
$\Delta n$ [589 nm, 25° C.]: 0.0950
Cp: 89.0° C.
$\gamma_1$[25° C.]: 160 m Pa · s.

Example 14

| Category | Liquid crystal monomer code | Content (%) |
|---|---|---|
| IV | BHHO-Cp1O-O4FF | 4.00 |
| III | CC-3-V | 29.00 |
| III | CCP-3-O1 | 2.00 |
| II | CCOY-2-O2 | 15.00 |
| II | CCOY-3-O2 | 15.00 |
| II | CCOY-4-O2 | 15.00 |
| II | PY-3-O2 | 12.00 |
| I | PQBHHO-3-O2 | 4.00 |
| I | GQBHHO-3-O2 | 4.00 |

$\Delta\varepsilon$[1 KHz, 25° C.]: −6.00
$\varepsilon_\perp$: 10.60
$\Delta n$ [589 nm, 25° C.]: 0.0990
Cp: 87.0° C.
$\gamma_1$[25° C.]: 165 m Pa · s.

Example 15

| Category | Liquid crystal monomer code | Content (%) |
|---|---|---|
| IV | BHHO-Cp1O-O4FF | 4.00 |
| III | CC-3-V | 29.00 |
| III | CPP-V-3 | 2.00 |
| II | CCOY-2-O2 | 15.00 |
| II | CCOY-3-O2 | 15.00 |
| II | CCOY-4-O2 | 15.00 |
| II | PY-3-O2 | 12.00 |
| I | PUQY-3-O2 | 4.00 |
| I | PUQY-3-O4 | 4.00 |

$\Delta\varepsilon$[1 KHz, 25° C.]: −5.60
$\varepsilon_\perp$: 10.10
$\Delta n$ [589 nm, 25° C.]: 0.1000
Cp: 85.0° C.
$\gamma_1$[25° C.]: 150 m Pa · s.

Example 16

| Category | Liquid crystal monomer code | Content (%) |
|---|---|---|
| III | CC-3-V | 19.00 |
| III | CC-3-V1 | 9.00 |
| III | CC-V-V1 | 20.00 |
| II | CCOY-2-O2 | 3.00 |
| II | CCOY-3-O2 | 8.00 |
| II | CCOY-4-O2 | 5.00 |
| III | CPP-1V-2 | 8.00 |
| IV | DFDBF-Cp1O-O4 | 4.00 |
| IV | DFDBF-Cp1O-O5 | 4.00 |

-continued

| Category | Liquid crystal monomer code | Content (%) |
|---|---|---|
| I | PUQY-Cp-O2 | 10.00 |
| I | PUQY-Cpr1-O4 | 10.0 |

Δε[1 KHz, 25° C.]: −2.10
$\varepsilon_\perp$: 5.99
Δn [589 nm, 25° C.]: 0.1106
Cp: 82.5° C.
$\gamma_1$[25° C.]: 97 m Pa · s.

Example 17

| Category | Liquid crystal monomer code | Content (%) |
|---|---|---|
| III | CC-3-V | 19.00 |
| III | CC-3-V1 | 9.00 |
| III | CC-V-V1 | 20.00 |
| II | CCOY-2-O2 | 3.00 |
| II | CCOY-3-O2 | 8.00 |
| II | CCOY-4-O2 | 5.00 |
| III | CPP-1V-2 | 8.00 |
| IV | DFDBF-Cp1O-O4 | 4.00 |
| IV | DFDBF-Cp1O-O5 | 4.00 |
| I | PUQDFDBF-3-O2 | 10.00 |
| I | PQDFDBF-3-O2 | 10.0 |

Δε[1 KHz, 25° C.]: −2.31
$\varepsilon_\perp$: 6.20
Δn [589 nm, 25° C.]: 0.1012
Cp: 80.5° C.
$\gamma_1$[25° C.]: 90 m Pa · s.

Example 18

| Category | Liquid crystal monomer code | Content (%) |
|---|---|---|
| III | CC-3-V | 19.00 |
| III | CC-3-V1 | 9.00 |
| III | CC-V-V1 | 20.00 |
| II | CCOY-2-O2 | 3.00 |
| II | CCOY-3-O2 | 8.00 |
| II | CCOY-4-O2 | 5.00 |
| III | CPP-1V-2 | 8.00 |
| IV | DFDBF-Cp1O-O4 | 4.00 |
| IV | DFDBF-Cp1O-O5 | 4.00 |
| I | GQDFDBF-3-O2 | 10.00 |
| I | PUQBHHO-3-O2 | 10.0 |

Δε[1 KHz, 25° C.]: −2.40
$\varepsilon_\perp$: 6.29
Δn [589 nm, 25° C.]: 0.1005
Cp: 83.4° C.
$\gamma_1$[25° C.]: 94 m Pa · s.

Example 19

| Category | Liquid crystal monomer code | Content (%) |
|---|---|---|
| III | CC-3-V | 19.00 |
| III | CC-3-V1 | 9.00 |
| III | CC-V-V1 | 20.00 |
| II | CCOY-2-O2 | 3.00 |
| II | CCOY-3-O2 | 8.00 |
| II | CCOY-4-O2 | 5.00 |
| III | CPP-1V-2 | 8.00 |
| IV | DFDBF-Cp1O-O4 | 4.00 |
| IV | DFDBF-Cp1O-O5 | 4.00 |

-continued

| Category | Liquid crystal monomer code | Content (%) |
|---|---|---|
| I | PQBHHO-3-O2 | 10.00 |
| I | GQBHHO-3-O2 | 10.00 |

Δε[1 KHz, 25° C.]: −2.42
$\varepsilon_\perp$: 6.31
Δn [589 nm, 25° C.]: 0.1060
Cp: 80.8° C.
$\gamma_1$[25° C.]: 94 m Pa · s.

Example 20

| Category | Liquid crystal monomer code | Content (%) |
|---|---|---|
| III | CC-3-V1 | 12.00 |
| III | CC-V-V1 | 4.00 |
| II | CCOY-2-O2 | 13.00 |
| II | CCOY-3-O2 | 13.00 |
| II | CCOY-4-O2 | 13.00 |
| II | PY-Cp-O2 | 15.00 |
| II | PY-Cpr1-O2 | 10.00 |
| I | DUQY-5-O2 | 20.00 |

Δε[1 KHz, 25° C.]: −5.40
$\varepsilon_\perp$: 9.90
Δn [589 nm, 25° C.]: 0.1000
Cp: 75.4° C.
$\gamma_1$[25° C.]: 160 m Pa · s.

Example 21

| Category | Liquid crystal monomer code | Content (%) |
|---|---|---|
| IV | BHHO-Cp1O-O4FF | 4.00 |
| III | CC-3-V | 25.00 |
| II | CCOY-2-O2 | 15.00 |
| II | CCOY-3-O2 | 15.00 |
| II | CCOY-4-O2 | 15.00 |
| V | PGP-Cpr1-F | 12.00 |
| II | PY-3-O2 | 10.00 |
| I | PUQY-3-O2 | 2.00 |
| I | PUQY-3-O4 | 2.00 |

Δε[1 KHz, 25° C.]: −4.60
$\varepsilon_\perp$: 9.10
Δn [589 nm, 25° C.]: 0.1119
Cp: 91.5° C.
$\gamma_1$[25° C.]: 166 m Pa · s.

The liquid crystal composition of the present invention has a good stability against light and heat, a lower viscosity, a wider refractive index that may be achieved by adjustment, and a higher clearing point (a very wide service temperature range), and in particular, the liquid crystal composition has a higher light transmittance, thus allowing a display device to have a higher brightness or an energy saving effect.

The invention claimed is:

1. A negative dielectric anisotropy liquid crystal composition, wherein said liquid crystal composition comprises one or more compounds represented by formula I2-4 to I2-7, I3-3, I3-4, I3-7 as a first component, and one or more compounds represented by formula II as a second component:

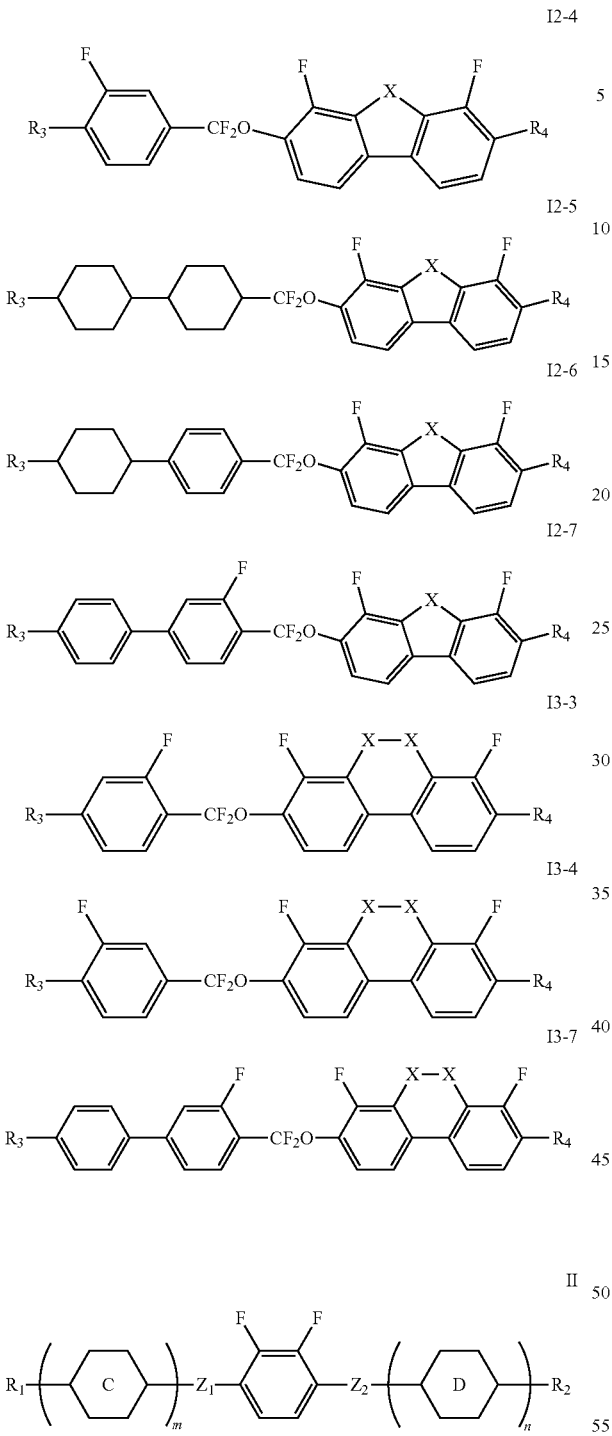

wherein

R₃ and R₄ each independently represent an alkyl group having a carbon atom number of 1-10, fluorine, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more $CH_2$ in the groups represented by $R_3$ and $R_4$ may be substituted with cyclopentyl, cyclobutyl or cyclopropyl;

$R_1$ and $R_2$ each independently represent an alkyl group having a carbon atom number of 1-10, fluorine, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more $CH_2$ in the groups represented by $R_1$ and $R_2$ may be substituted with cyclopentyl, cyclobutyl or cyclopropyl;

$Z_1$ and $Z_2$ each independently represent a single bond, —$CH_2CH_2$— or —$CH_2O$—;

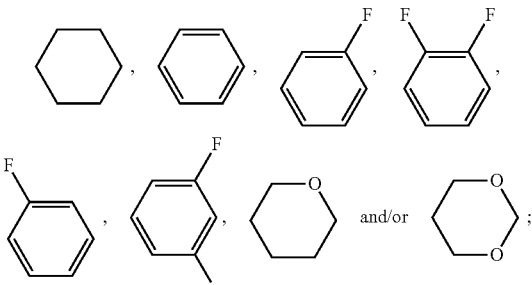

each independently represent one or more of

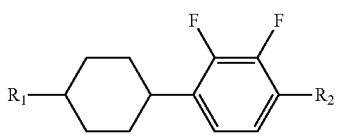

m represents 1, 2 or 3;

n represents 0 or 1;

each X independently represents $CH_2$, O or S.

2. The liquid crystal composition according to claim 1, wherein said one or more compounds represented by formula II are one or more of compounds represented by formulas II1 to II13:

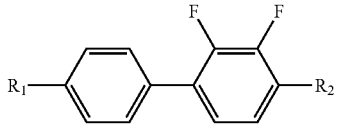

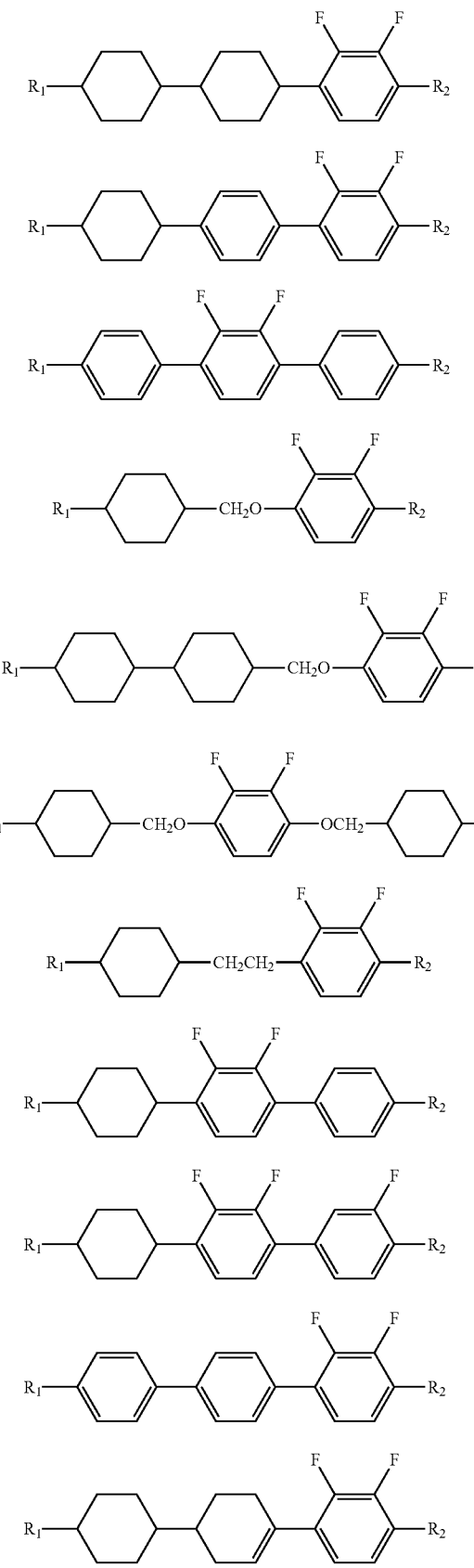

wherein
R₁ and R₂ each independently represent an alkyl group having a carbon atom number of 1-10, fluorine, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more $CH_2$ in the groups represented by $R_1$ and $R_2$ may be substituted with cyclopentyl, cyclobutyl or cyclopropyl.

3. The liquid crystal composition according to claim 2, wherein in said liquid crystal composition, a total content in mass percentage of said one or more compounds represented by formula I2-4 to I2-7, I3-3, I3-4, I3-7 is 1-40%, and a total content in mass percentage of said one or more compounds represented by formula II is 1-65%.

4. The liquid crystal composition according to claim 1, wherein said liquid crystal composition further comprises one or more compounds represented by formula III

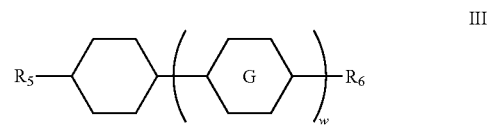

wherein
$R_5$ and $R_6$ each independently represent an alkyl group having a carbon atom number of 1-10, an alkoxy group having a carbon atom number of 1-10, an alkenyl group having a carbon atom number of 2-10 or an alkenoxy group having a carbon atom number of 3-8, and any one or more unconnected $CH_2$ in the groups represented by $R_5$ and $R_6$ may be substituted with cyclopentyl, cyclobutyl, cyclopropyl, or —O—;

represents one or more of

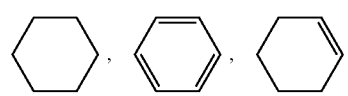

or any fluorobenzene; and
each w independently represents 1, 2 or 3.

5. The liquid crystal composition according to claim 4, wherein said one or more compounds represented by formula III are one or more compounds represented by formulas III1 to III5:

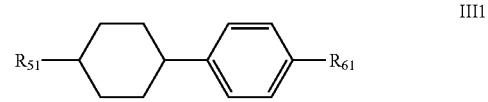

-continued

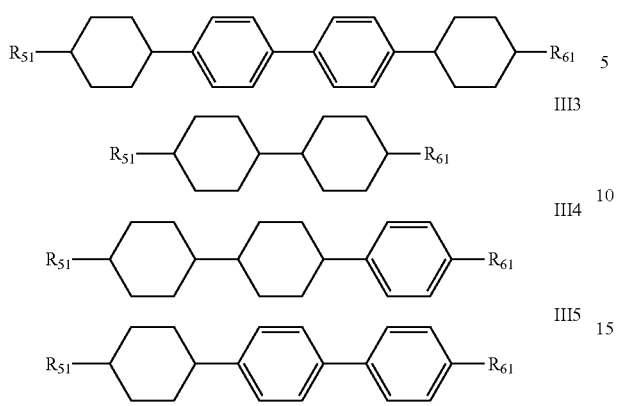

wherein $R_{51}$ and $R_{61}$ each independently represent an alkyl group having a carbon atom number of 1-6, an alkoxy group having a carbon atom number of 1-6, an alkenyl group having a carbon atom number of 2-6 or an alkenoxy group having a carbon atom number of 3-6.

6. The liquid crystal composition according to claim 1, wherein said liquid crystal composition further comprises one or more compounds represented by formula IV

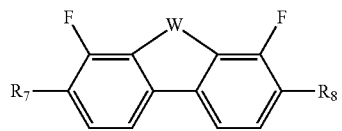

wherein
$R_7$ and $R_8$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more $CH_2$ in groups $R_7$ and $R_8$ may be substituted with cyclopentyl, cyclobutyl or cyclopropyl;

and W represents —O—, —S— or —$CH_2O$—.

7. The liquid crystal composition according to claim 1, wherein said liquid crystal composition further comprises one or more compounds represented by formula V:

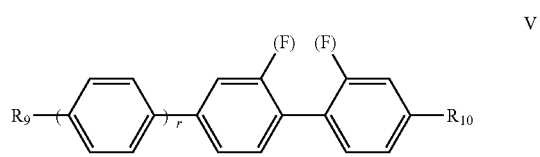

wherein
$R_9$ represents an alkyl group having a carbon atom number of 1-5 or an alkenyl group having a carbon atom number of 2-5;
$R_{10}$ represents a F atom, an alkyl group having a carbon atom number of 1-5, an alkoxy group having a carbon atom number of 1-5 or an alkenyl group having a carbon atom number of 2-5;
any one or more $CH_2$ in the groups represented by $R_9$ and $R_{10}$ may be substituted with cyclopentyl, cyclobutyl or cyclopropyl;
r represents 0 or 1;
and each (F) independently represents H or F.

8. A liquid crystal display element or liquid crystal display comprising the liquid crystal composition of claim 1, wherein said liquid crystal display element or liquid crystal display is an active matrix display element or display or a passive matrix display element or display.

* * * * *